United States Patent [19]

Chen

[11] 4,121,624
[45] Oct. 24, 1978

[54] ELECTRICALLY CONDUCTIVE FLEXIBLE TUBE

[75] Inventor: Chi Y. Chen, Maspeth, N.Y.

[73] Assignee: Fabricated Plastics, Inc., Morristown, N.J.

[21] Appl. No.: 580,491

[22] Filed: May 23, 1975

[51] Int. Cl.² .......................... F16L 11/11; F16L 11/12
[52] U.S. Cl. .................................... 138/122; 138/129; 138/154; 174/47
[58] Field of Search ............... 138/120, 122, 129, 154; 174/47; 252/511

[56] References Cited

U.S. PATENT DOCUMENTS

| | | | |
|---|---|---|---|
| 3,070,132 | 12/1962 | Sheridan | 174/47 |
| 3,166,688 | 1/1965 | Rowand et al. | 174/47 |
| 3,255,780 | 5/1966 | Squirrell | 138/122 |
| 3,273,600 | 9/1966 | Swan | 138/122 |
| 3,334,040 | 8/1967 | Conrad et al. | 252/511 |
| 3,849,333 | 11/1974 | Lloyd et al. | 252/511 |

FOREIGN PATENT DOCUMENTS

| | | | |
|---|---|---|---|
| 1,391,262 | 1/1965 | France | 138/129 |
| 958,875 | 5/1964 | United Kingdom | 138/129 |

Primary Examiner—Richard R. Stearns

[57] ABSTRACT

This invention relates to an improved spirally wound flexible tube of the type having an inner electrically conductive plastic strip of channel shaped cross-section including a relatively wide flat web and flexible flanges bordering the margins of said flat web, the inner strip being helically wound to form a tube with the flanges directed radially outward and arranged in contiguous pairs with each succeeding convolution; and an outer nonconductive plastic cap section of channel shaped cross section helically wound over the inner plastic strip, the cap including a relatively narrow web having flexible flanges directed radially inward and overlying the contiguous pairs of radially outwardly directed flanges and bonded through the distal side. The improvement resides in an electrically conductive adhesive extending in a helical path and disposed between said inner plastic strip and said outer plastic cap section for a continuous communication with at least the tip portion of said contiguous pairs of flexible flanges directed radially outward from said inner plastic strip.

1 Claim, 4 Drawing Figures

ELECTRICALLY CONDUCTIVE FLEXIBLE TUBE

BACKGROUND OF THE INVENTION

It has been known for some time that fluids flowing in a hose, tube or pipe can create an electrostatic charge. In some atmospheres this charge can be extremely dangerous as for example, in the transporting of flammable liquids or gases as might be encountered in hospitals and in the chemical industry. The electrostatic charge, if not dissipated, may be sufficient to iqnite flammable vapors thereby causing a fire or explosion or cause a failure in the hose.

Hoses, including those which can be flexed and axially extended, have been rendered electrically conductive for the purpose of dissipating electrical charges. Certain standards have been set by the National Fire Protection Association for such hoses even when under axial tension in order for them to be considered conductive hoses.

DESCRIPTION OF THE PRIOR ART

It has been proposed to render spirally wound hose electrically conductive by incorporating an electrically conductive carbon black in the polymer mix used for manufacturing the hose. For example, the spirally wound hoses as described in Squirrell U.S. Pat. No. 3,255,780 have been rendered electrically conductive by forming the hoses from a polymer mix containing electrically conductive carbon. The principle disadvantage of this type of hose is that it comes in only one color, which is black. As might be expected, some environments e.g., hospital environments, may prefer for aesthetic reasons to have a hose which is electrically conductive which is a color other than black. An overcoat or veneer may be applied to the hose in order to produce a hose having a plurality of colors. But this adds to the cost of manufacture. Additionally the hose suffers from the disadvantage that the hose must be made out of an expensive material as both the inner and outer sections must be electrically conductive.

It has also been proposed to modify a spirally wound hose as shown in Swan U.S. Pat. No. 3,273,600 for rendering it electrically conductive by inserting a metal or copper wire in a rib section between the flanges in the inner strip. The wire is connected to the ground at one end and the source at the other end for dissipating any electrical buildup. One of the problems with using an electrically conductive wire in this type of spirally wound hose is that it is expensive to manufacture in that it takes a substantial amount of wire per linear foot of hose produced. This not only adds to the cost, but to the weight as well. The manufacture of such spirally wound hose can be difficult, or at least more complex than is the manufacture of the channel without the wire and rib section.

It has also been proposed to modify the spirally wound hose of Swan by employing an electrically conductive plastic material in the manufacture of the inner plastic channel. This approach worked reasonably well when the hose is under compression. However, when the hose is axially extended, it loses its electrical conductivity.

SUMMARY OF THE INVENTION

This invention relates to an improvement in a spirally wound flexible tube of the type having;

an inner electrically conductive plastic strip of a channel shaped cross section including a relatively wide flat web and flexible flanges bordering the margins of the web, the inner strip being helically wound to form a tube with the flanges directed radially outward and arranged in contiguous pairs with each succeeding convolution; and an outer nonconductive plastic cap section having a relatively narrow web and flexible flanges bordering the margins of said web with the outer plastic cap section helically wound over the inner plastic strip with the narrow web overlying the contiguous pairs of radially outwardly directed flanges and the radially inwardly directed flexible flanges on said outer plastic cap section overlying and bonded to the distal sides of the outwardly extending flexible flanges on the inner strip.

The improvement in this flexible tube comprises an electrically conductive adhesive extending in a helical path and disposed between the inner plastic strip and the outer plastic cap section for continuous communication with the contiguous pairs of flanges of said inner plastic strips. Preferably the adhesive is a hot melt adhesive containing electrically conductive carbon and is contained in the cap section in sufficient proportion to hold the cap section slightly off the tips of the contiguous pairs of flexible flanges.

Advantages of the spirally wound flexible hose or tube contemplated by this invention include:

a hose which can be provided in a variety of colors by employing an outer plastic cap section of the color desired;

a hose having adequate electrical conductivity for use in a variety of hazardous atmospheres even under axial tension;

the ability to form an electrically conductive tube employing a low cost material for the outer cap section or from a material having desired external properties which are not required or desired for the internal surface.

THE DRAWINGS

DESCRIPTION OF THE PREFERRED EMBODIMENTS

The flexible tubes or hoses of this invention are of the type disclosed in Swan U.S. Pat. No. 3,273,600 and the subject matter of that patent is incorporated by reference. Broadly, the flexible tube or hose can be used in a variety of applications which require a highly flexible and rigid hose e.g., as in an anesthesiology lab or as in a vacuum cleaner.

Figure 1:
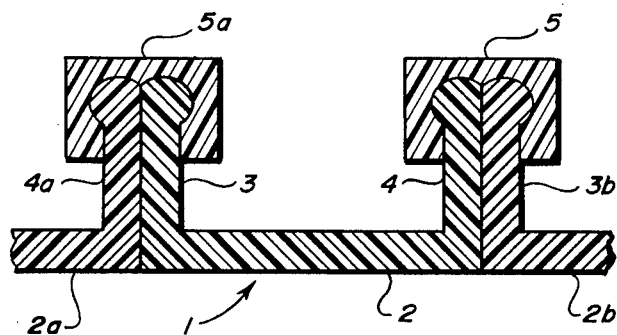
FIG. 1 is a view in cross-sectional elevation of the wall of a flexible tube in compression.

In referring to FIG. 1, there is shown a view in cross-section of a wall of a flexible hose, spirally wound, under compression. As is known, the flexible hose is formed by wrapping a channel shaped inner plastic strip 1 having a relatively wide web 2 bordered by angularly, flexible flange 3 and angularly flexible flange 4 at its margins about a mandrel. The flanges have a rounded tip so that a bead is formed by the combination. The flexible flanges 3 and 4 are disposed radially outward from the mandrel. In winding the plastic inner strip about the mandrel, as viewed with strip 1, the next succeeding revolution of the strip will result in the strip having web section 2a disposed against web section 2 with flange 4a abutting against flange 3 to form a contiguous pair of flanges. As viewed with the preceeding revolution, a web section 2b abuts web section 2 with flexible flange 3b abutting flexible flange 4 to form a contiguous pair of flanges. A plastic cap 5 is disposed over the pair of flexible flanges 3b and 4 and is wound spirally over these flange sections. As viewed with the succeeding revolution, plastic cap 5a is wound over flanges 3 and 4a. Often an adhesive is used to bond the plastic cap section to the distal sides of the flexible flanges.

Figure 2:
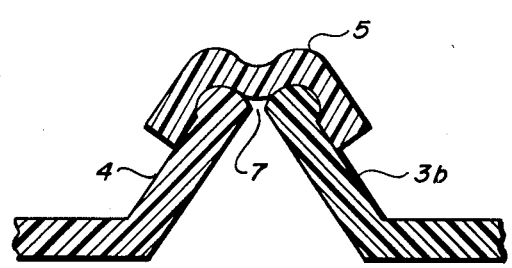
FIG. 2 is a cross-sectional view of a wall of a portion of the flexible tube in FIG. 1 in which the tube is under axial tension.

Even though the inner plastic strip 1 has been made of an electrically conductive polymeric material, the flexible hose often did not have desired electrical conductivity required by the National Fire Protection Association. Quite surprisingly it was observed that the hose, when under compression, exhibited the desired electrical conductivity to meet the standards of the Fire Protection Association. But, when the hose was under axial tension, as noted in FIG. 2, then it did not meet such conductivity standards. It was observed that when the flexible hose was under extreme axial tension, flexible flanges i.e., 3b and 4, as shown in FIG. 2, tended to separate leaving a space 7 therebetween. The size of this space is exaggerated in the drawing but the space quite often is large enough to raise the resistivity of the hose to a level above the standard desired.

Figure 3:
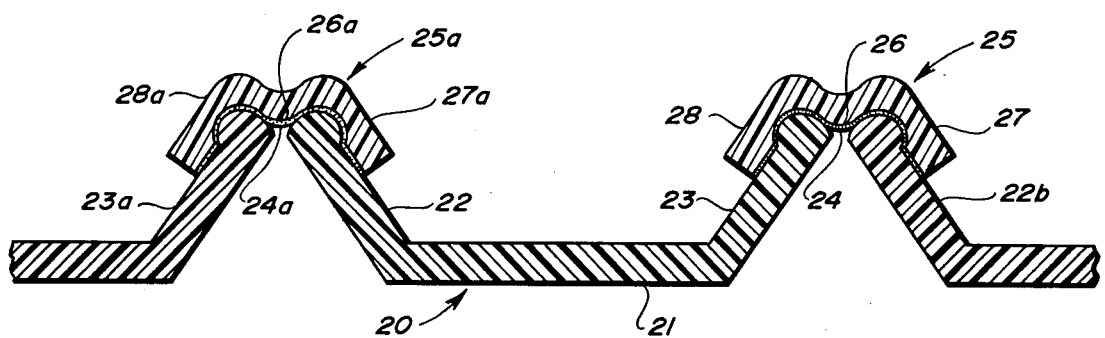
FIG. 3 is a view in cross-sectional elevation under axial tension showing the adhesive in the cap section for bonding to the flanges of the inner strip.

In practicing this invention, as shown in FIG. 3, a channel shaped inner plastic strip 20 which is electrically conductive is wound in a helical manner about a mandrel. The inner plastic strip 20 has a relatively wide web section 21 which is bordered at its margins by flexible flanges 22 and 23. Flexible flange 22 is contiguous with the flexible flange 23a, as viewed in the succeeding revolution, whereas flexible flange 23 is contiguous with flexible flange 22b, as viewed in the preceding revolution.

Cap section 25 is spirally wound over the inner strip 20 so that its flange sections 27 and 28 directed radially inward and bordering web section 26, encase flange sections 22 and 23 of the inner plastic strip. Thus, with the succeeding revolution flanges 27a and 28a encase outwardly directing flanges 22 and 23a and web section 26a is held slightly off the tips of flanges 22 and 23a by adhesive 24a thereby providing an electrical circuit between flanges 22b to 23 to 22 to 23a and so on for the length of the hose.

A hot melt adhesive 24 is applied to plastic cap section 25, generally along the internal surface of web section 26 and flange sections 27 and 28 athough it can be applied just to the narrow web section 26, for holding the plastic cap section slightly off the tips of flanges 22 and 23. The presence of the hot melt adhesive 24 brings the flexible flanges 22b and 23 and flanges 22 and 23a in electrical communication with each other by filling the space 7, as shown in FIG. 2, with an electrically conductive medium. Thus, the wall section of the flexible hose becomes sufficiently conductive for dissipating any static buildup that may occur in the hose.

Figure 4:
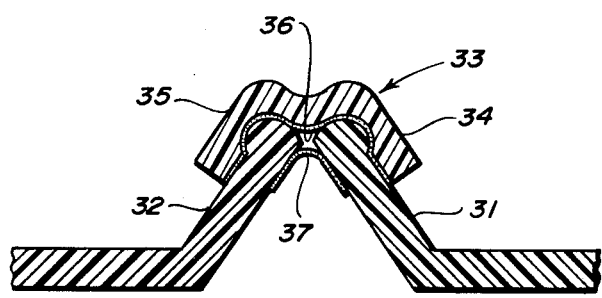
FIG. 4 is a view of the hose of FIG. 3 including an adhesive between the flanges on the inner strip.

FIG. 4 is a view of another embodiment of the invention similar to FIG. 3 in that a pair of contiguous flanges 31 and 32 and encased by an outer cap section 33 and its flanges 34 and 35 has an electrically conductive adhesive 36 applied to the cap section to provide an electrical bridge between the flange portions 31 and 32 and an electrically conductive, flexible adhesive 37 applied between the flanges 31 and 32. This gives added protection that the electrical conductivity is satisfactory.

It is possible to form an electrical circuit via the adhesive which extends in a helical path about the flexible tube or hose. However, it is obvious the electrical circuit would be longer and presumably of greater resistance than the electrical circuit of a linear length of the hose by at least a factor of pi times the diameter of the hose which of course does not include the pitch of the helical wound inner strip. Further, the conductive portion is always in contact with the fluid transported and such is not the case where only a wire is used to dissipate the electrical charge or the hot melt adhesive is employed. Also, it is easier to load the plastic material used for the liner with greater quantities of conductive carbon than the adhesive because the adhesive at higher loadings has a tendency to lose its ability to bond the flanges and cause failure of the hose. Thus, even though the adhesive may have a higher resistance than the resistance of the inner plastic strip, the fact that it connects the strip circumferentially about the flanges a complete electrical circuit is completed from end to end. This technique also has a safety factor built in that if there is a break in the bond at a particular section of the flexible hose i.e., there is a separation between the contiguous pairs of flanges and the cap section, the electrical circuit established in the flexible hose may not be broken because of other points of connection between the adhesive and the flexible flanges on the inner plastic strip.

Virtually any adhesive which is electrically conductive and can be bonded to the polymeric material used for forming the inner plastic strip and the outer plastic cap section can be used for practicing the invention. The requirements of the adhesive essentially are: that they provide the bonding strength necessary to prevent the flexible flange sections from pulling away from the outer plastic cap section under axial tension and to provide sufficient electrical conductivity to bridge the space which may be generated when the flexible hose is under axial tension.

In a preferred embodiment the inner strip and the hot melt adhesive is a copolymer of ethylene and ethyl acrylate or vinyl acetate in combination with carbon black. Such electrically conductive materials are disclosed in U.S. Pat. No. 3,849,333 and are incorporated by reference.

What is claimed is:

1. In a flexible tube comprising an inner electrically conductive plastic strip having:
   a channel shaped cross-section including a relatively wide flat web and angularly flexible flanges bordering the margins of said web, said inner strip being helically wound to form a tube with the flexible flanges directed radially outward and arranged in contiguous pairs with each succeeding convolution; and
   an outer nonconductive plastic cap section having a relatively narrow web section and angularly flexible flanges bordering its margins, said outer plastic cap section being helically wound over said inner plastic strip with the web section overlying the contiguous pairs of radially outward directed flanges and the flexible flanges on said outer plastic strip being directed radially inwardly for overlying the flanges on the inner plastic strip, the improvement for making said flexible tube electrically conductive under axial tension which comprises:

an electrically conductive adhesive located on the flanges and across the web of the nonconductive cap and disposed between (1) the contiguous pairs of flanges of the inner conductive plastic strip and (2) the outer nonconductive plastic cap section, providing continuous electrical communication from one flange to the next of a contiguous pair of flanges on said inner plastic strip, said adhesive being primarily disposed between (1) the narrow web section of said outer plastic cap section and (2) said flanges of said inner strip, and wherein a flexible conductive adhesive is disposed between the flanges forming the contiguous pairs of said inner liner strip.

* * * * *